Patented Aug. 26, 1924.

1,506,450

UNITED STATES PATENT OFFICE.

PAUL SCHADE, OF HERMSDORF, NEAR BERLIN, GERMANY, ASSIGNOR TO GENERAL ELECTRIC COMPANY, A CORPORATION OF NEW YORK.

ELECTRICAL MULTIWIRE SYSTEM.

Application filed May 3, 1922. Serial No. 558,222.

*To all whom it may concern:*

Be it known that I, PAUL SCHADE, a citizen of the German Republic, and residing at 14 Kneippstr., Hermsdorf, near Berlin, Germany, have invented certain new and useful Improvements in Electrical Multiwire Systems, of which the following is a specification.

My invention relates to improvements in electrical multi-wire systems, and its object is to provide means in such systems for localizing the effect of a fault such as short-circuits or earth connections occurring in sections of the lines.

For this purpose I make use of the fact that the voltage of a faulty wire of the system is lower than that of the normal wire or wires. In carrying out the invention I provide means controlled by the loss of pressure occurring in the said wires for automatically switching out the faulty wire or section. One way of putting the invention into effect consists in connecting points of the lines which normally have the same potential by coils which cooperate in the form of pressure coils of watt relays with current coils provided in the lines for opening switches controlling the lines. Preferably, the said points to which the pressure coils are connected are located near the ends of the parts of the lines to be controlled. Therefore it is ordinarily necessary to increase the loss of pressure by special means. Accordingly the current coils are disposed between the bus-bars located at the stations for connecting the parallel lines and the said points to which the pressure coils are connected, the pressure consuming capacity of the current coils being preferably assisted by ohmic or inductive resistances connected in series therewith.

Figure 1:
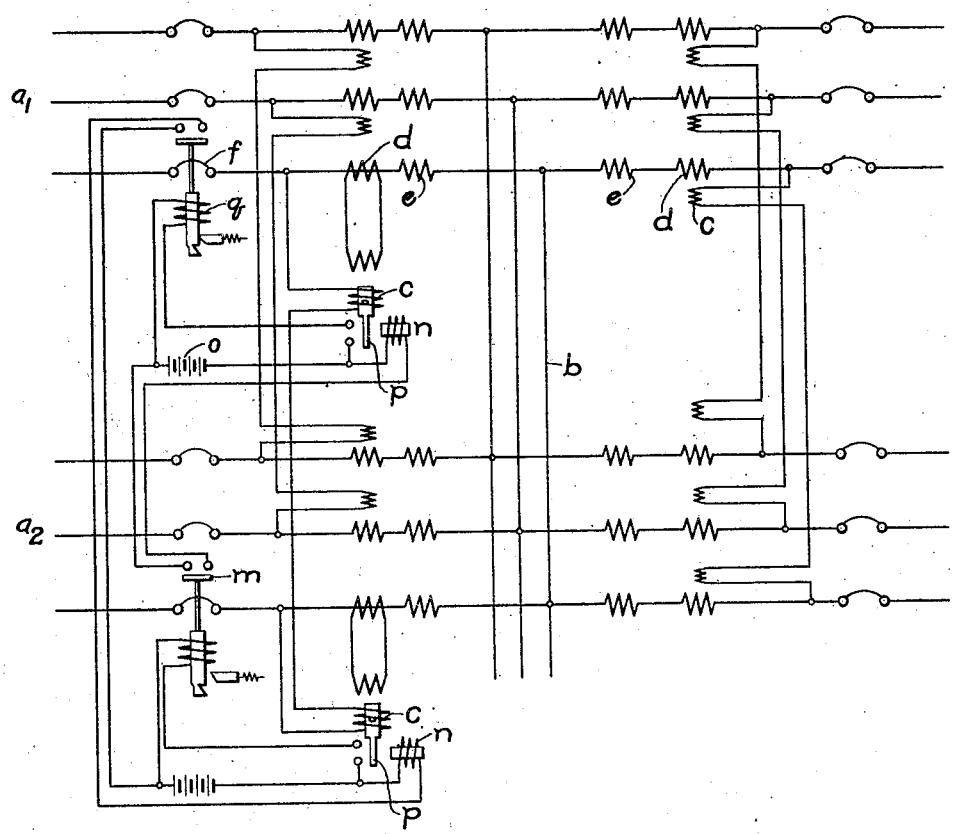
Figure 2:
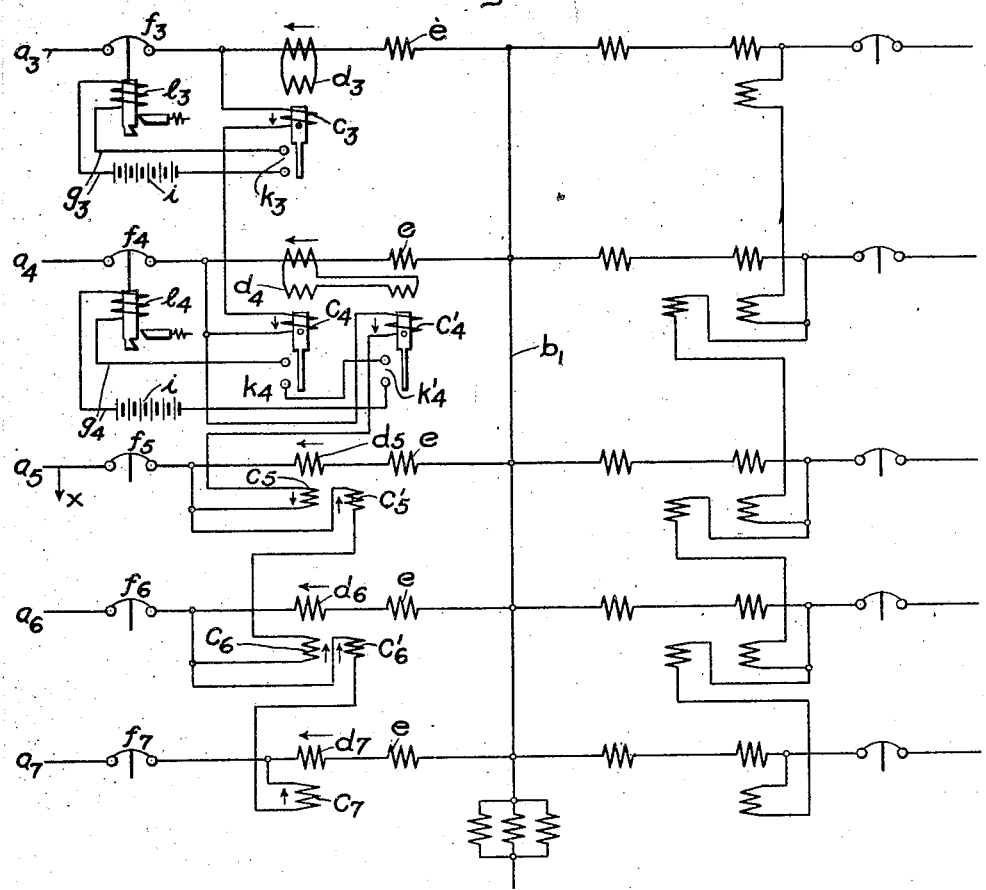

For the purpose of explaining the invention several examples embodying the same have been shown in the accompanying drawings in which, Fig. 1, is a diagram illustrating the system, Fig. 2, shows a similar diagram illustrating a modification.

In the example shown in Fig. 1 the net consists of two lines $a_1$ and $a_2$ which are directly connected at one of their ends by busbars $b$, so that the points thus connected have the same potential. In addition at the stations corresponding points of the lines are connected over pressure or potential coils $c$, and between the bus-bars $b$ and the pressure coils $c$ the lines include current coils $d$ and choking coils $e$. The pressure reducing powers of the current coils $d$ and the choking coils $e$ are equal in both parallel lines. Therefore, ordinarily and when the current intensities are the same in both lines, the loss of pressure in the lines is likewise the same and the points to which the pressure coils are connected have the same potential. If however, a fault occurs in one of the lines, for example a short-circuit, the current intensity in the said line is increased, which results in an increased loss of pressure. By the potential difference thus produced between opposite ends of the pressure coils, a current is built up in the said pressure coil (which normally is not traversed by current). The pressure coils cooperate with the current coils $d$ in a watt relay so as to cause a movement in one or the other direction, according to the line $a_1$ or $a_2$ in which the fault has occurred, and the watt relays can be used directly or indirectly to open the switch $f$ of the troubled line and to disconnect the same from the supply of electric energy.

Each of the switches $f$ may be provided with an operating coil $q$ arranged to be interconnected with a source of power $o$ through the movable member $p$ of the corresponding control relay. In order to simplify the drawing only two of the switches are illustrated as provided with operating coils, but it will of course be understood that each of the switches shown is identical with the others and operated in the same manner. Where the switch is directly operated I prefer to connect each switch with a watt relay and to connect two pressure coils in series, each of which cooperates with the current coil belonging to the respective switch. Upon the disconnection of a faulty conductor from the bus bar, the load current flowing in the corresponding conductor lead, which comprises a reactor $e$ and current coil $d$, is of course reduced to zero and there will result a difference in potential between the lead of the disconnected conductor and those of conductors carrying load current. As a result of the potential difference thus produced between the idle and working leads, current will flow through the voltage coils by which the idle lead is interconnected with the adjacent working lead or leads and a torque will be exerted by the corresponding relays. For the purpose of neutralizing this torque, means operative in response to the opening of a non-corresponding switch is provided. In Fig. 1 each of the switches is provided with a back contact $m$ arranged to connect an electromagnet $n$ to the source of power $o$ in the open position of the switch. The electromagnets $n$, two only of which are shown in order to simplify the drawing, are arranged to exert upon the movable member $p$ of the relays a counter torque which neutralizes the torque produced by a flow of current through the voltage coils interconnecting the idle and working leads.

When using my improved systems in a net comprising more than two lines, and more particularly where an odd number of lines is provided, in some cases the loss of pressure of one line must be compared with the loss of pressure of a plurality of the other lines. Therefore, currents are produced also in the connections between non-troubled lines. Therefore, means must be provided to prevent non-troubled lines from being disconnected by the said currents. For this purpose the switch for disconnecting one of the lines is also controlled by the difference of the loss of pressure of the troubled line and that of each of the other lines directly compared with the troubled line, so that the switch is opened only, if the loss of pressure exceeds that of any of the other lines, which is the case where a line is troubled.

In Fig. 2 I have shown a net comprising five parallel lines $a_3$, $a_4$, $a_5$, $a_6$, and $a_7$. All the lines are connected at the station by a bus-bar $b_1$. The pressure coils have been indicated by the characters $c_3$, $c_4$, $c_4'$, $c_5$, $c_5'$, $c_6$, $c_6'$, and $c_7$, which coils are interposed respectively between corresponding points of adjacent lines. The current coils have received the characters $d_3$, $d_4$, $d_5$, $d_6$, and $d_7$, which are connected in series with choking coils $e_1$. $f_3$, $f_4$, $f_5$, $f_6$, and $f_7$ are the switches.

If, for example the inner line $a_5$ is disturbed, as is indicated in the figure by an arrow $x$, the loss of pressure in the said line is increased as compared to all the other lines $a_3$, $a_4$, $a_6$, and $a_7$. Therefore, currents are produced in the pressure coils, and more particularly in the coils $c_4'$, $c_5$ and $c_5'$, $c_6$ directly disposed between the line $a_5$ and the lines $a_4$ and $a_6$ respectively, and in the pressure coils $c_3$, $c_4$ and $c_6'$, $c_7$ disposed respectively between the said lines $a_4$ and $a_3$ and the lines $a_6$ and $a_7$. For a certain moment the direction of the current in the lines $a_3$, $a_4$, $a_5$, $a_6$, $a_7$ is the same, as has been indicated by the arrows. Furthermore currents of the same direction flow between the lines $a_3$, $a_4$, and $a_4$, $a_5$ on the one hand, and the lines $a_7$, $a_6$ and $a_6$, $a_5$ on the other hand. However, between the lines $a_3$ and $a_5$ the direction of the current is opposite to that between the lines $a_7$ and $a_5$.

I make use of this fact in order to prevent the non-troubled lines $a_4$ or $a_6$ from being disconnected by currents flowing between $a_4$ and $a_3$ or $a_6$ and $a_7$. For this purpose in each line $a_4$, $a_5$, $a_6$ directly connected over the pressure coils with a plurality of other lines two pressure coils cooperate with a current coil, for example, in the line $a_4$ the pressure coils $c_4$ and $c_4'$ cooperate with the current coil $d_4$, in the line $a_5$ the pressure coils $c_5$, $c_5'$ cooperate with the current coil $d_5$, and in the line $a_6$ the pressure coils $c_6$, $c_6'$ cooperate with the current coil $d_6$, or generally speaking one of the pressure coils of each of the conductors branched off from a line cooperate with the current coil included in the line. Now the system is arranged so that the line is not switched out if the currents in the pressure coils connected therewith are of even direction, or in other words if one of the currents of the branches flows towards the line and the other one away therefrom, and that the line is switched out if the currents in the branches are oppositely directed, or in other words, if in both branches the currents flow towards the line or away therefrom. The first condition is met in the non-troubled lines $a_4$, $a_6$, and the second one in the troubled line $a_5$.

The pressure coils can be made to cooperate in the manner described in different ways. The switches $f_3$—$f_7$ may be operated by coils $l_3$—$l_7$, only two of which are shown, arranged to be energized from a suitable source of direct current $i$ through leads $g_3$—$g_7$, and contacts $k_3$—$k_7$ opened and closed in response to movement of the movable coils $c_3$—$c_7$ of the relays in the lines $a_3$—$a_7$. The contacts of the branch circuits are closed only with a certain direction of the pressure difference between the connected points of the lines. In connection with such lines from which two conductors are branched off two watt relays are provided, so that even when closing one of them, the branch circuits $g_3$—$g_7$ remain open, unless also the second relay is closed. The conditions are such that at a time only the branch circuit of the troubled line is closed by the watt relays. Therefore, assuming the line $a_5$ to be troubled the watt relays comprising current coils $d_3$, $d_7$ produce torques acting to open the contacts $k_3$ and $k_7$, and also the watt relays comprising current coils $d_4$ and $d_6$, while in the relays comprising current coils $d_4$, $d_5$, $d_5$, and $d_7$, the torques tend to close the contacts. Therefore no current flows through the branch circuits $g_3$, $g_4$, $g_6$, and $g_7$, and only the branch circuit $g_5$ is operative for switching out the line $a_5$.

The cooperation of the relays and switches shown in Fig. 2 will be apparent from the description of Fig. 1.

Instead of connecting all the lines with each other over pressure coils, in case of a plurality of lines a part of the lines may be combined in pairs in the manner described with reference to Fig. 1, the remaining lines being connected in the manner described with reference to Fig. 2.

I claim:

1. A system of the class described wherein a bus bar is arranged to be interconnected with a plurality of conductors of the same polarity through a plurality of switches each adapted to control the connection between one of said conductors and said bus bar, characterized by the fact that means responsive to a drop in the voltage of a faulty conductor and to the current flowing in said conductor are provided for opening the switch by which said conductor is connected to said bus bar.

2. A system of the class described wherein a bus bar is arranged to be interconnected with a plurality of conductors of the same polarity through a plurality of switches each adapted to control the connection between one of said conductors and said bus bar, comprising a plurality of relays each provided with a current coil arranged to be connected in series with the corresponding conductor and a voltage coil connected between said conductor and another conductor, each of said relays being arranged to control the operation of the corresponding switch in response to a fault on the corresponding conductor.

3. A system of the class described wherein a bus bar is arranged to be interconnected with a plurality of conductors of the same polarity through a plurality of switches each adapted to control the connection between one of said conductors and said bus bar, comprising control means responsive to a drop in the voltage of a faulty conductor and to the current flowing in said conductor for opening the switch by which said conductor is connected to said bus bar, and a plurality of choke coils each arranged to be connected in series with one of said conductors.

4. A system of the class described wherein a bus bar is arranged to be interconnected with a plurality of conductors of the same polarity through a plurality of switches each adapted to control the connection between one of said conductors and said bus bar, comprising a plurality of relays each provided with a current coil arranged to be connected in series with the corresponding conductor and a plurality of voltage coils each arranged to interconnect said conductor with a different one of said conductors, and means controlled by said relay for disconnecting said conductor from said bus bar.

5. A system of the class described wherein a bus bar is arranged to be interconnected with a plurality of conductors of the same polarity through a plurality of switches each adapted to control the connection between one of said conductors and said bus bar, comprising a plurality of relays each provided with a current coil arranged to be connected in series with the corresponding conductor and a plurality of movable voltage coils each arranged to interconnect said conductor with a different one of said conductors, a plurality of control circuits each comprising a switch operating coil and a source of power, and means fixed to each of said voltage coils for closing said control circuit in response to energization of said voltage coils in a direction to send current through them in the same direction with respect to said corresponding conductor.

6. A system of the class described wherein a bus bar is arranged to be interconnected with a plurality of conductors through a plurality of switches each adapted to control the connection between one of said conductors and said bus bar, comprising control means responsive to a drop in the voltage of a faulty conductor and to the current flowing in said conductor for opening the switch by which said conductor is connected to said bus bar, and compensating means operable in response to the opening of said switch for neutralizing the torque produced by said control means as a result of the opening of said switch.

7. A system of the class described wherein a bus bar is arranged to be interconnected with a plurality of conductors through a plurality of switches each adapted to control the connection between one of said conductors and said bus bar, comprising a plurality of control means each provided with a current coil arranged to be connected in series with the corresponding conductor and a plurality of movable voltage coils each arranged to interconnect said conductor with a different one of said conductors, a plurality of control circuits each comprising a switch operating coil and a source of power, means fixed to each of said voltage coils for closing said control circuit in response to energization of said voltage coils in a direction to send current through them in the same direction with respect to said corresponding conductor, a plurality of compensating means each operable in response to the opening of a non-corresponding switch for neutralizing the torque produced by a control means as a result of the opening of the non-corresponding switch, and a plurality of choke coils each arranged to be connected in series with one of said conductors.

In testimony whereof I affix my signature.

PAUL SCHADE.